(12) United States Patent
Löffler et al.

(10) Patent No.: US 12,341,377 B2
(45) Date of Patent: Jun. 24, 2025

(54) MEDIA GAP MOTOR FOR A TURBOCHARGER

(71) Applicant: G+L INNOTEC GMBH, Laupheim (DE)

(72) Inventors: Rudolf Löffler, Unteressendorf (DE); Holger Gödeke, Stetten (DE); Ralf Heber, Erbach-Ersingen (DE); Bernhard Spleiss, Uttenweiler (DE)

(73) Assignee: G&L INNOTEC GMBH, Laupheim (DE)

( * ) Notice: Subject to any disclaimer, the term of this patent is extended or adjusted under 35 U.S.C. 154(b) by 500 days.

(21) Appl. No.: 17/755,958

(22) PCT Filed: Nov. 12, 2020

(86) PCT No.: PCT/EP2020/081970
§ 371 (c)(1),
(2) Date: May 12, 2022

(87) PCT Pub. No.: WO2021/094491
PCT Pub. Date: May 20, 2021

(65) Prior Publication Data
US 2022/0385120 A1  Dec. 1, 2022

(30) Foreign Application Priority Data
Nov. 12, 2019  (EP) .................... 19208737

(51) Int. Cl.
*H02K 1/14* (2006.01)
*F02B 39/10* (2006.01)
*H02K 3/52* (2006.01)

(52) U.S. Cl.
CPC ............. *H02K 1/148* (2013.01); *F02B 39/10* (2013.01); *H02K 3/522* (2013.01)

(58) Field of Classification Search
CPC ............ F02B 39/10; F02B 33/40; F02B 37/10
See application file for complete search history.

(56) References Cited

U.S. PATENT DOCUMENTS 5,473,211 A * 12/1995 Arkkio .................. H02K 17/20
                                                        310/180
5,986,377 A * 11/1999 Yamada ................. H02K 15/06
                                                     310/216.013
(Continued)

FOREIGN PATENT DOCUMENTS

DE    102017207532 A1   11/2018
EP       0642210 A1    3/1995
(Continued)

OTHER PUBLICATIONS

"European Application Serial No. 19208737.7, European Search Report dated Mar. 11, 2020", w/ Concise Statement of Relevance, (Mar. 11, 2020), 10 pgs.
(Continued)

*Primary Examiner* — J. Todd Newton
(74) *Attorney, Agent, or Firm* — Schwegman Lundberg & Woessner, P.A.

(57) ABSTRACT

The present disclosure relates to a media gap motor for a turbocharger. The proposed media gap motor contains a rotor and a stator, wherein the stator comprises multiple fins which extend from an inner portion radially towards the rotor in a flow chamber formed between the stator and the rotor. The fins do not extend as far as the rotor, and therefore a gap is formed between an inner end of the fins and the rotor, wherein in internal diameter of the fins is at least 1.2 times and at most 3 times an external diameter of the rotor.

28 Claims, 18 Drawing Sheets

(56) References Cited

U.S. PATENT DOCUMENTS

Figure 3:
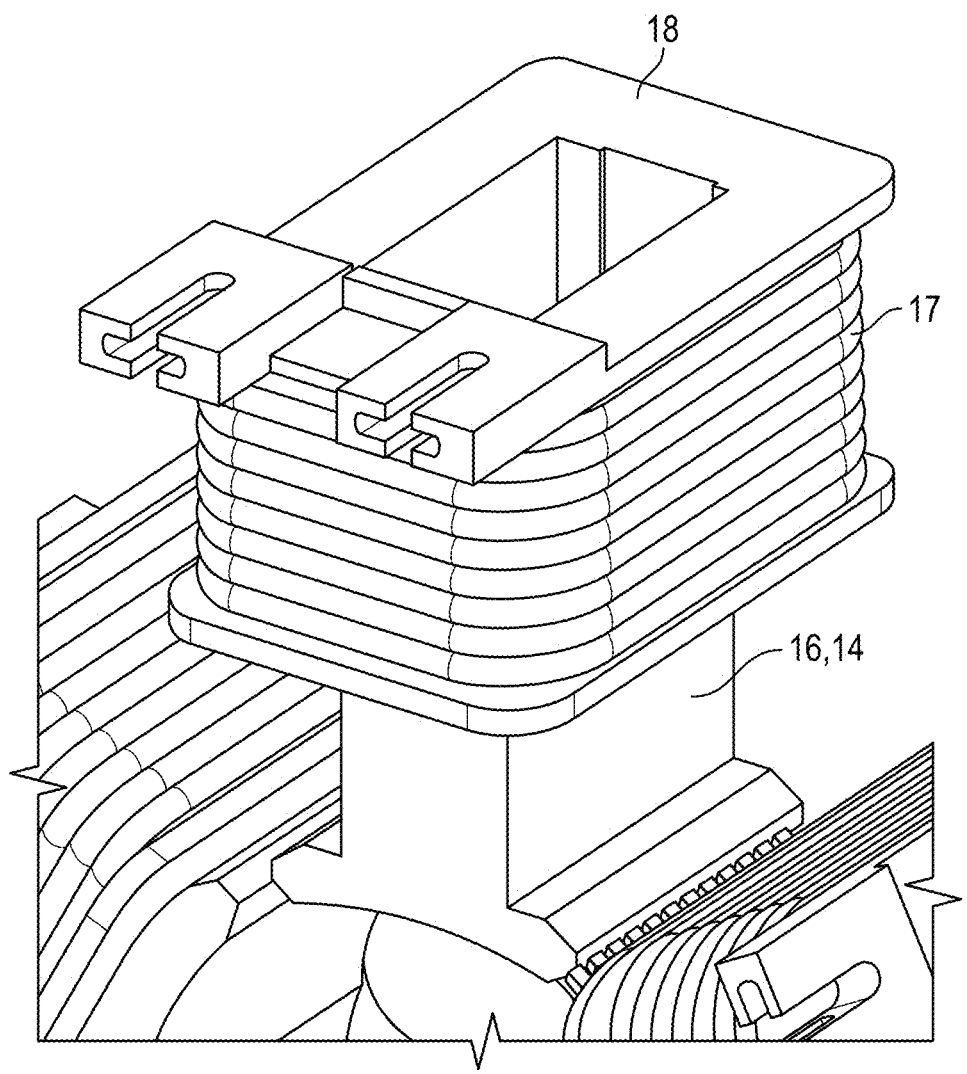

| | | | |
|---|---|---|---|
| 6,844,653 B2* | 1/2005 | Kolomeitsev | H02K 1/148 |
| | | | 310/216.082 |
| 2002/0093269 A1* | 7/2002 | Harter | H02K 1/148 |
| | | | 310/254.1 |
| 2002/0135255 A1* | 9/2002 | Williams | F04D 25/08 |
| | | | 310/216.075 |
| 2009/0127942 A1* | 5/2009 | Rahman | H02K 3/493 |
| | | | 310/44 |
| 2009/0174267 A1* | 7/2009 | Bischof | F04D 25/0606 |
| | | | 310/52 |
| 2013/0169074 A1* | 7/2013 | Hussain | H02K 5/128 |
| | | | 310/49.43 |
| 2020/0248704 A1* | 8/2020 | Bäuerle | H02K 3/522 |
| 2021/0156300 A1* | 5/2021 | Nau | H02K 7/14 |

FOREIGN PATENT DOCUMENTS

| | | |
|---|---|---|
| EP | 1995426 A1 | 11/2008 |
| EP | 2072824 A2 | 6/2009 |
| EP | 2158387 A1 | 3/2010 |
| WO | WO-2008141670 A1 | 11/2008 |

OTHER PUBLICATIONS

"International Application Serial No. PCT/EP2020/081970, International Search Report dated Dec. 2, 2020", w/ English Translation, (Dec. 2, 2020), 7 pgs.

"International Application Serial No. PCT/EP2020/081970, Written Opinion dated Dec. 2, 2020", (Dec. 2, 2020), 6 pgs.

Gödeke, Holger, et al., "Hybrid turbocharger with innovative electric motor", MTZ worldwide 75.3, (2014), 26-31.

"Chinese Application Serial No. 202080089079.3, Office Action dated Jun. 26, 2023", w English Translation, (Jun. 26, 2023), 18 pgs.

"Chinese Office Action for Chinese Application No. 202080089079.3 dated Jan. 6, 2024.", W English Translation, 14 pgs.

"Chinese Search Report for Application No. 202080089079.3, dated Jan. 4, 2024.", W English Translation, 4 pgs.

* cited by examiner

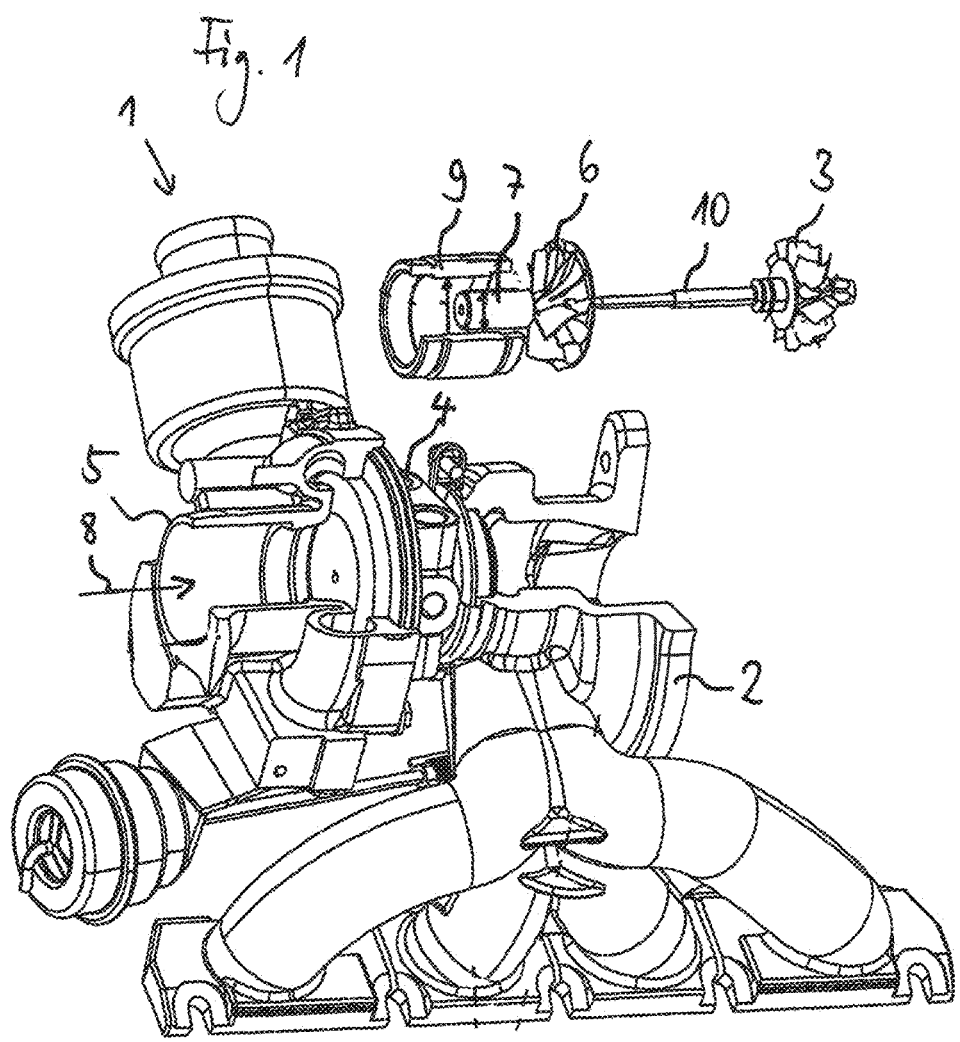

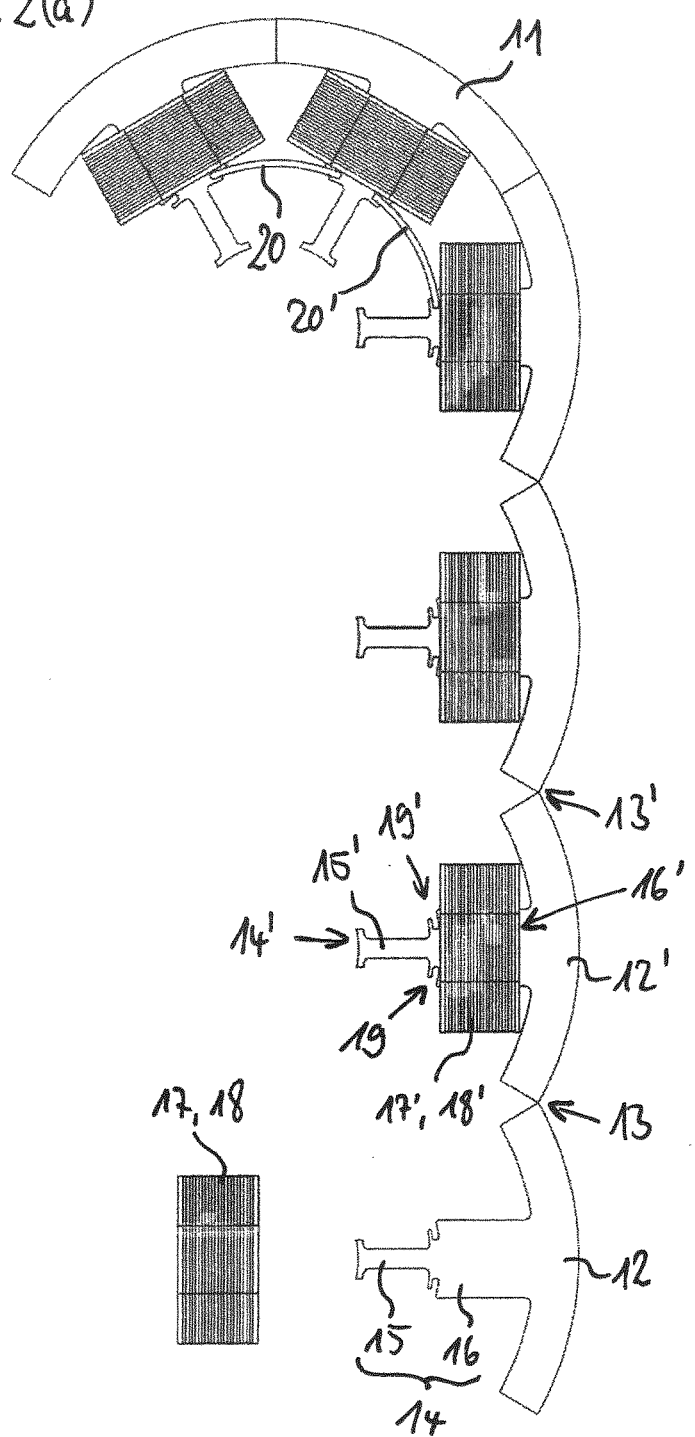

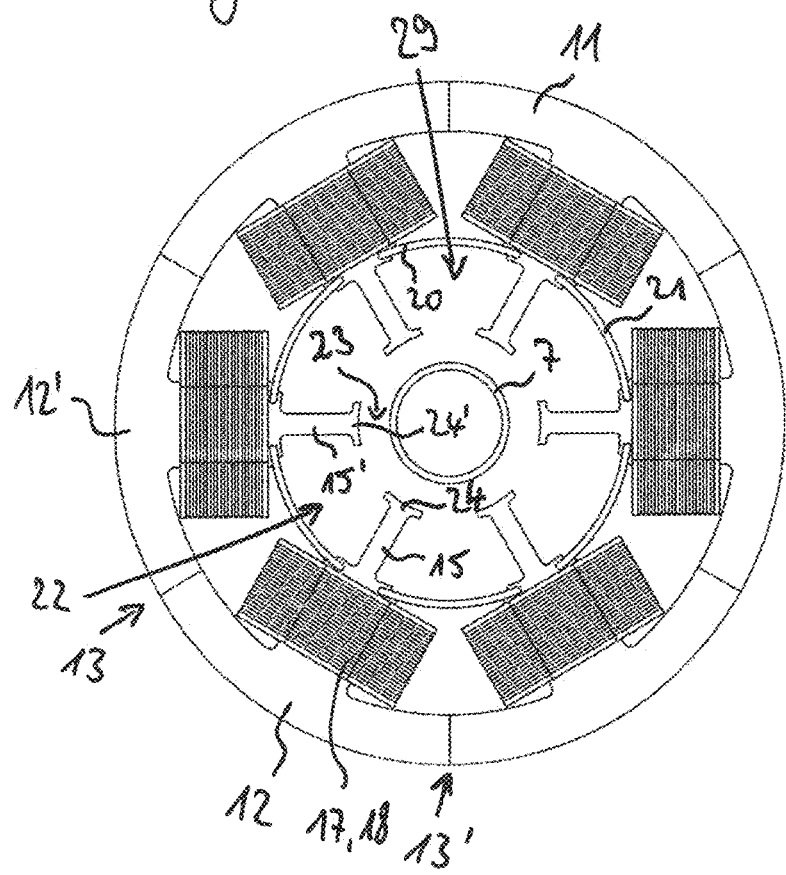

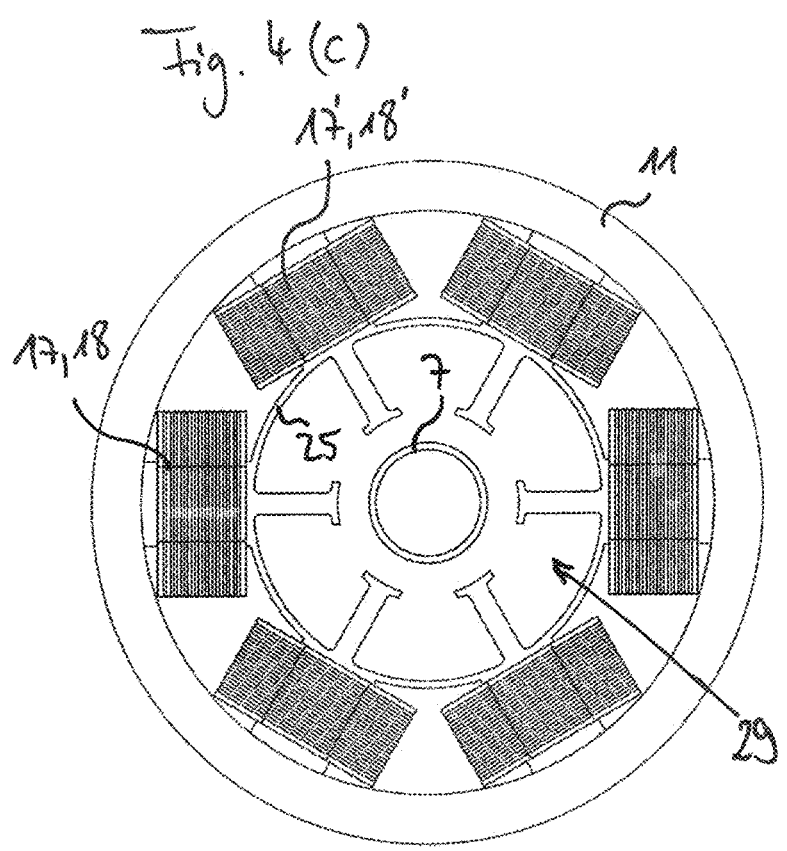

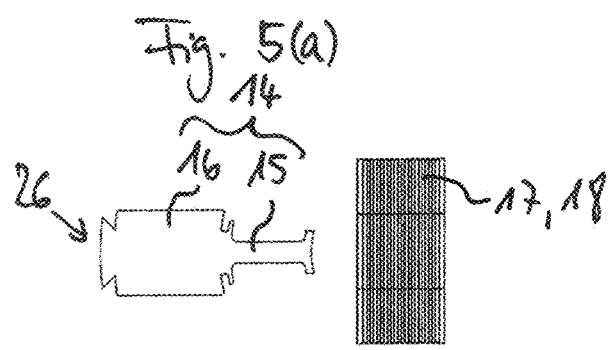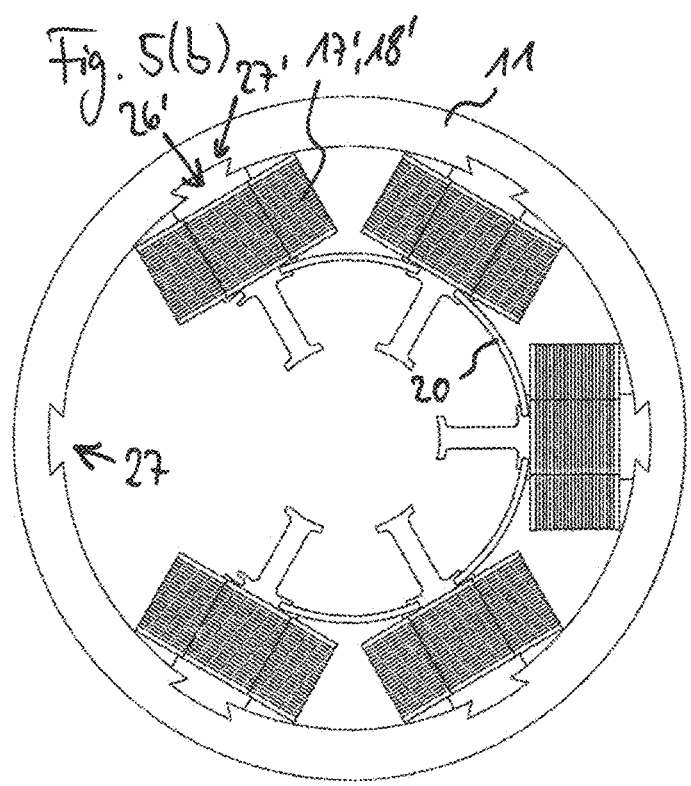

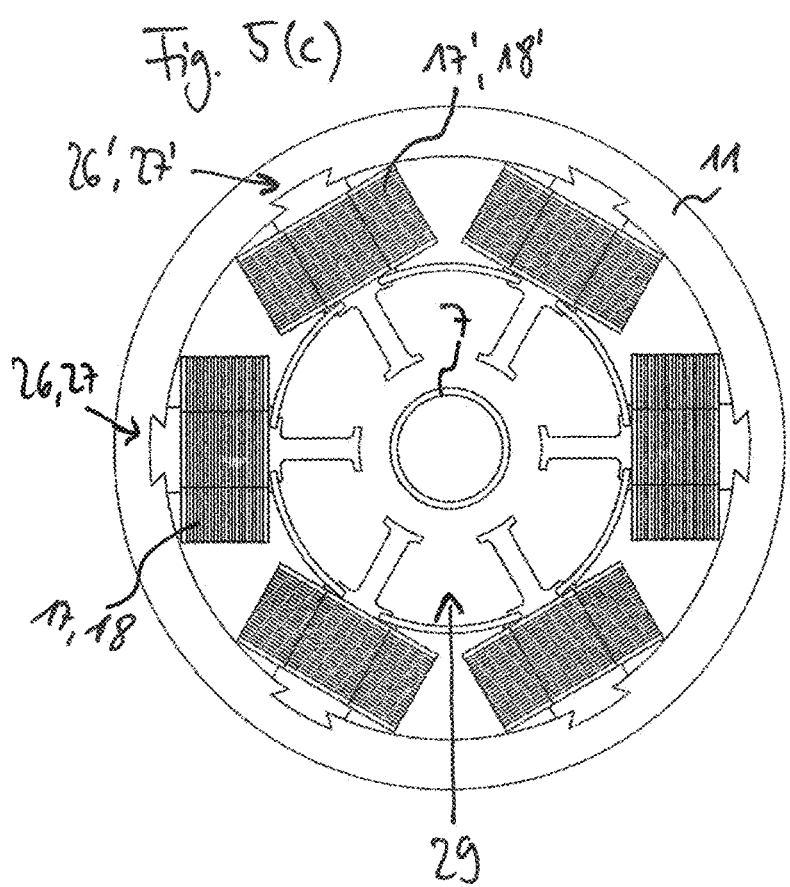

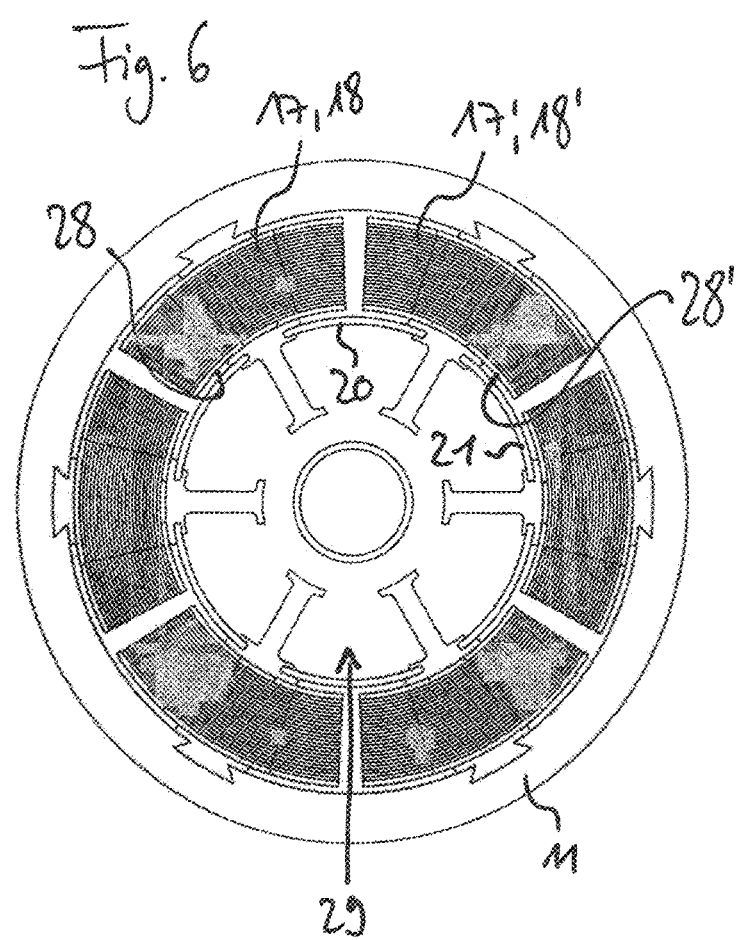

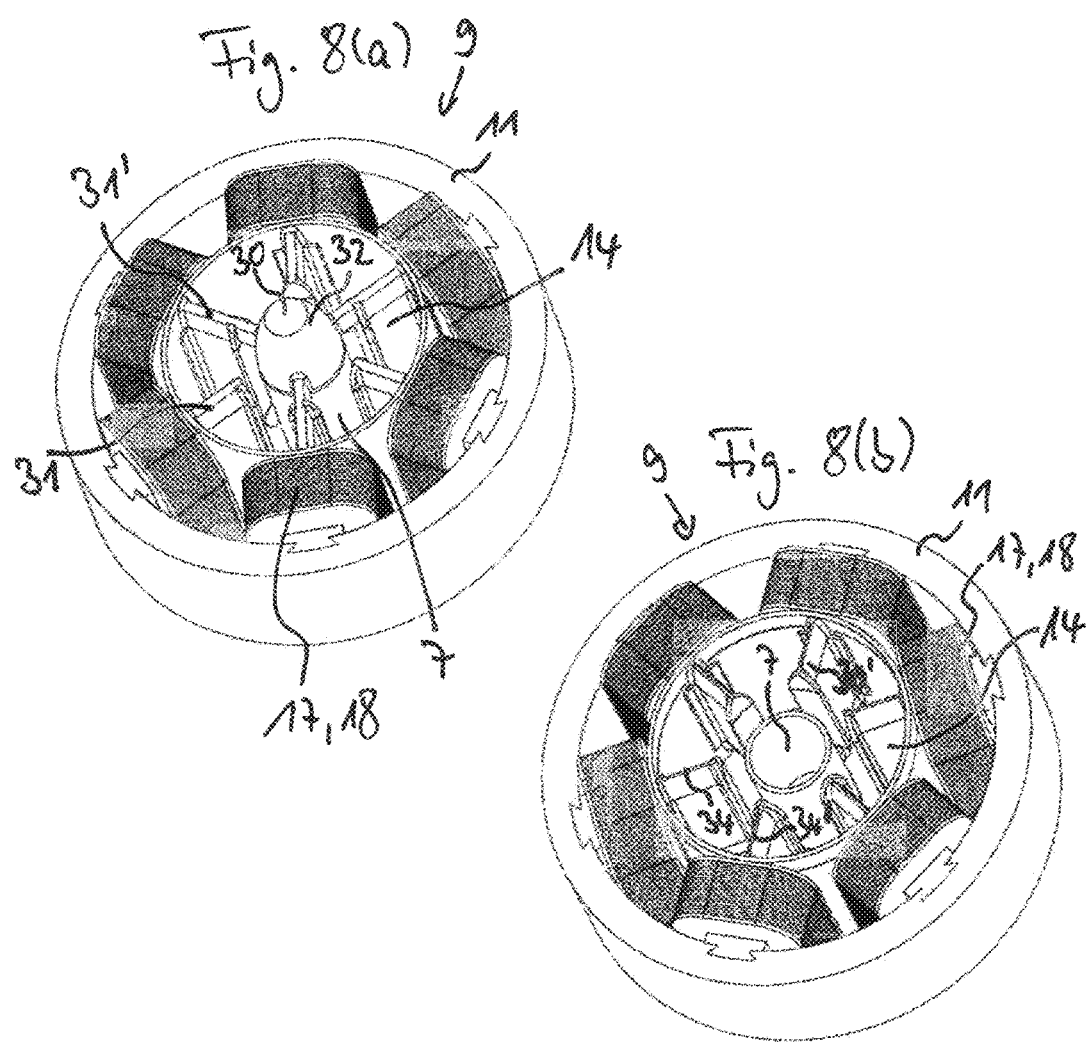

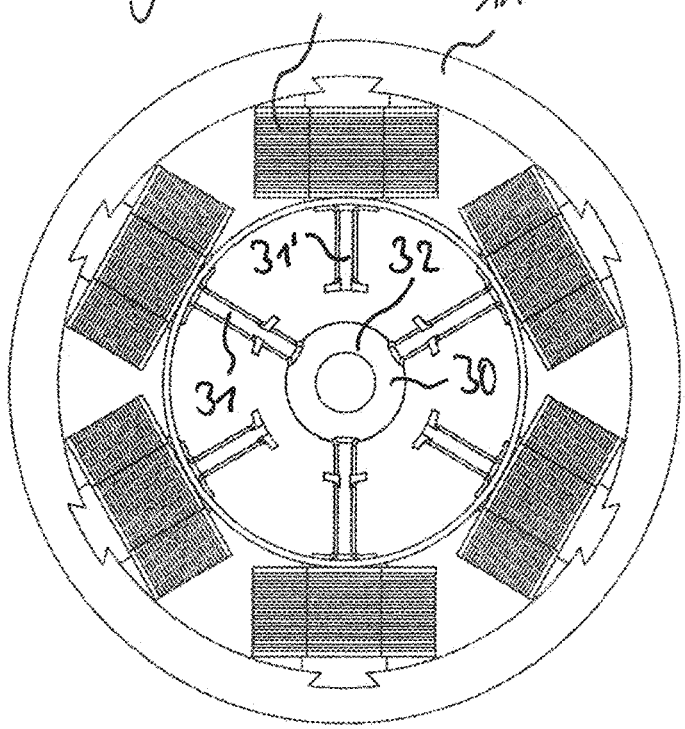

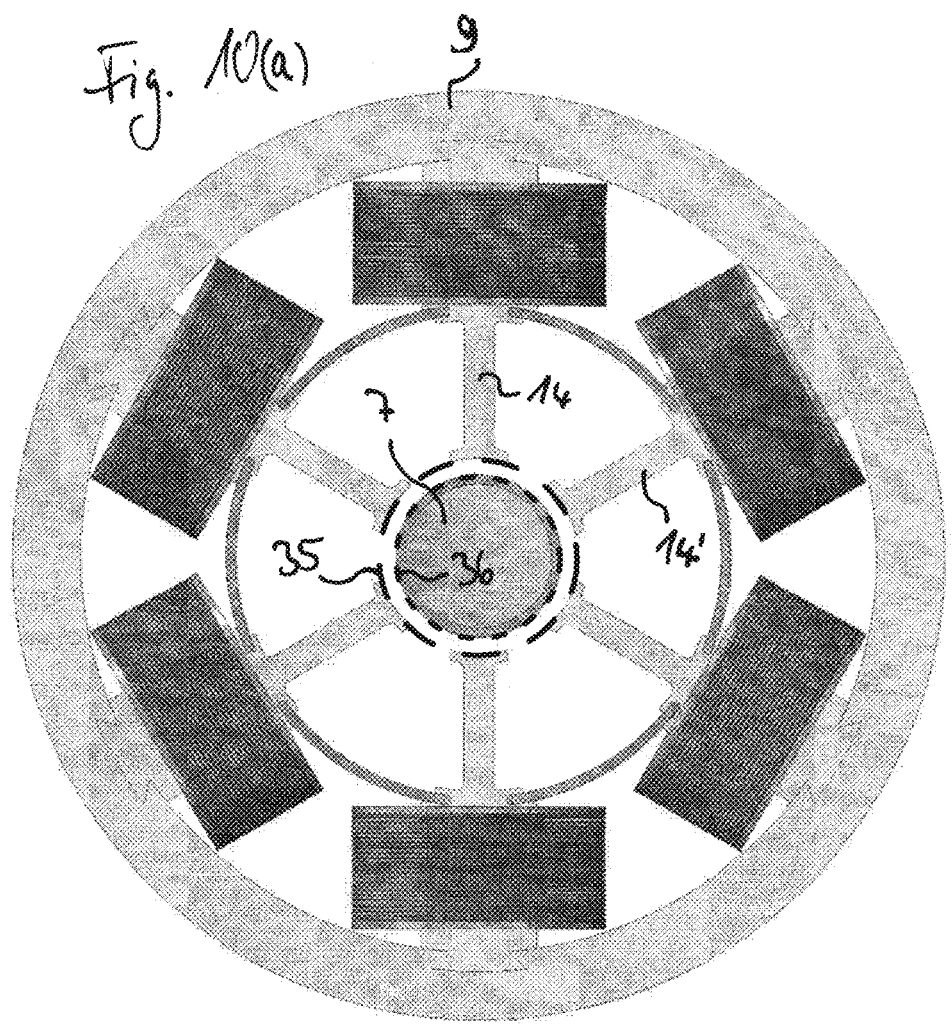

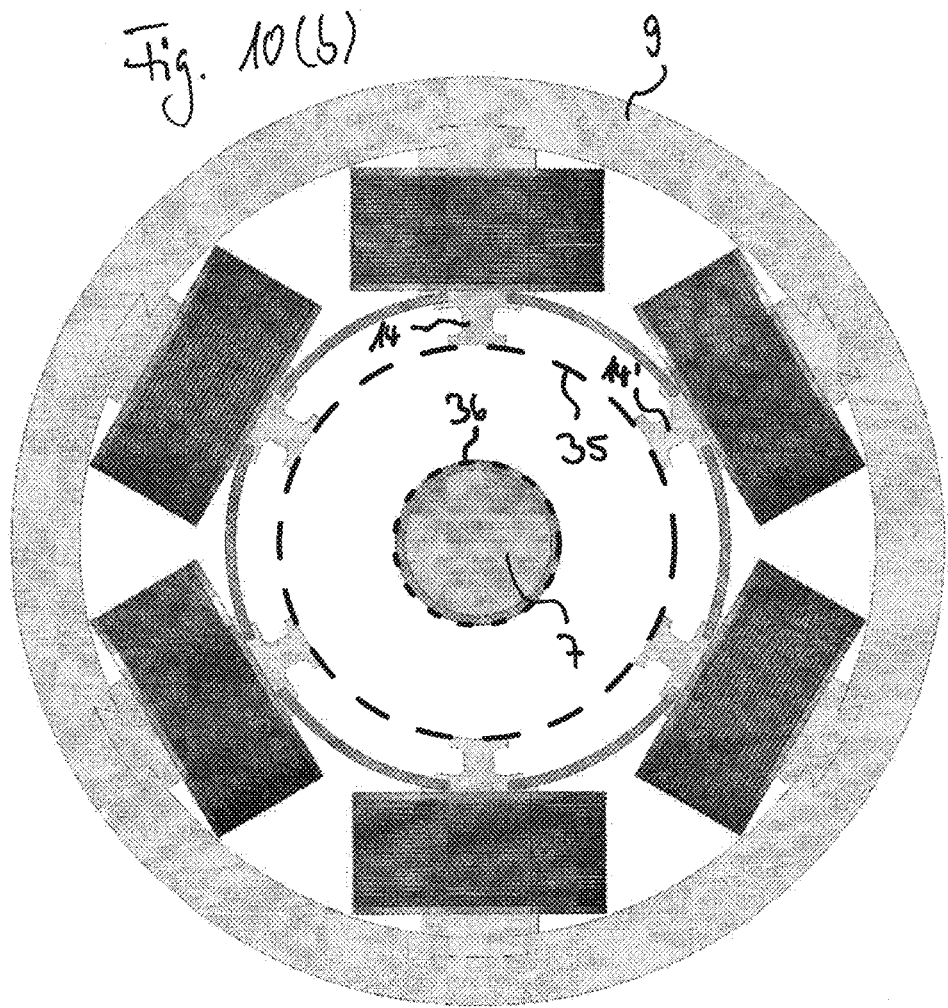

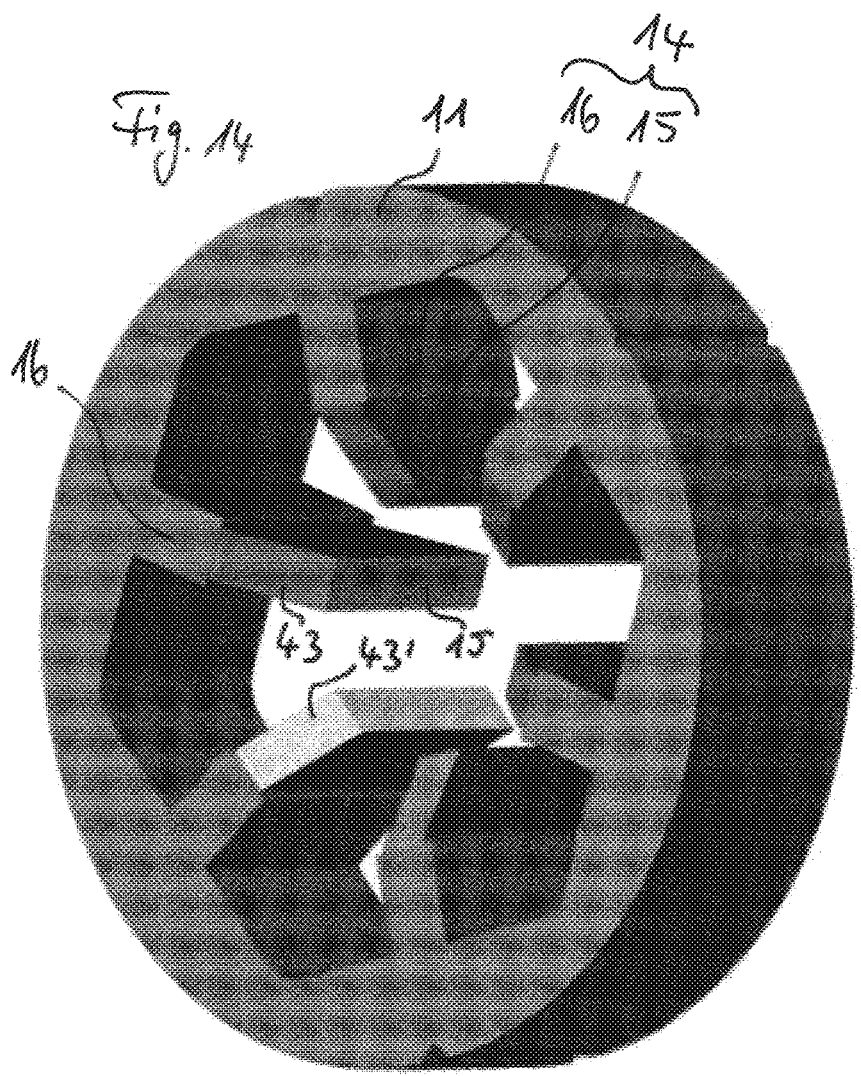

MEDIA GAP MOTOR FOR A TURBOCHARGER

PRIORITY APPLICATIONS

This application is a U.S. National Stage Filing under 35 U.S.C. § 371 from International Application No. PCT/EP2020/081970, filed on Nov. 12, 2020, and published as WO2021/094491 on May 20, 2021, which claims the benefit of priority to European Application No. 19208737.7, filed on Nov. 12, 2019; the benefit of priority of each of which is hereby claimed herein, and which applications and publications are hereby incorporated herein by reference in their entireties.

The present application relates to a media gap motor, in particular for a turbocharger, according to the preamble of claim 1.

Internal combustion engines having turbochargers are known from the prior art. An exhaust gas stream from an internal combustion engine is usually used to drive a turbine wheel. Said turbine wheel is coupled to a compressor wheel, for example, by means of a shaft, ensuring that fresh air fed into the combustion chamber is compressed. Such pre-compression or supercharging leads to increased engine performance or increased torque compared to conventional internal combustion engines. However, with such supercharged internal combustion engines, there is the problem of so-called turbo lag, which occurs in particular when starting and accelerating from low speeds of a vehicle, that is, when the internal combustion engine is to be accelerated quickly into higher power ranges. This is due to the fact that the increased air quantity requirement on the air supply side can only be provided with a delay (among other things due to the inertia of the turbine wheel/compressor wheel system).

In order to reduce the delay and to supply a correct amount of fresh air, it can be provided that the turbocharger comprises an electric motor having a stator and rotor, a rotor magnet of the rotor being integrated into the compressor wheel. Prior art of a related type is described, for example, in publication WO 2008 141 670 A1.

Comparable media gap motors can comprise a large gap between the rotor and stator due to their design. This can lead to higher currents being required to generate torque compared to conventional electric motors. For this reason, such media gap motors can disadvantageously have low torque constants. This problem can be alleviated by using stator teeth or bars that reach directly up to the rotor, thus improving the magnetic flux of the e-motors. A medium can be transported here through the stator slots that are not used for the winding. The document EP 2 072 824 A1 describes prior art of a related type.

Document EP 0 642 210 A1 relates to a high-speed electric motor. This electric motor comprises a relatively large air gap and is not characterized by fins that extend radially in a flow chamber formed between the stator and the rotor. This electric motor therefore doers not comprise stator slots through which a medium flows. Prior art of a related type is also described in document US 2013/169074 A1. Document DE 10 2017 207532 A1 describes an electrical media gap machine having a stator and a rotor, the rotor being surrounded by an inner sleeve and an outer sleeve arranged coaxially with the inner sleeve. Between the inner sleeve and the outer sleeve, the single flow path for the medium is formed only through the outer sleeve. A flow chamber is therefore not formed between the stator and the rotor.

However, these solutions can result in these motors exhibiting a high torque non-uniformity (torque ripple) in the energized state and a high cogging torque when idling, preventing use in many areas of application, such as in electrically assisted turbochargers. In addition, such motors can only achieve low performance, since the bars quickly become saturated and high magnetic losses lead to strong heating.

The object of the present application is therefore to propose an improved media gap motor, in particular for a turbocharger, which, on the one hand ensures a reduction in the delay and the supply of the correct quantity of a medium, in particular fresh air, and, on the other hand, enables an optimized magnetic flux and optimized heat dissipation. wherein torque non-uniformity and cogging torque are reduced or avoided. In addition, the media gap motor should have a comparatively simple, robust structure and be less susceptible to faults.

This object is achieved by a media gap motor having the features of independent claim 1. Advantageous developments result from the features of the dependent claims and the exemplary embodiments.

The proposed media gap motor includes a rotor and a stator, the stator, possibly optionally but particularly advantageously having fins which extend by means of an inner portion radially toward the rotor in a flow chamber formed between the stator and the rotor. In most embodiments, it is provided that the fins do not extend by means of their inner portions as far as the rotor, and therefore a gap is formed between an inner end of the fins and the rotor. An internal diameter of the fins can optionally be at least 1.2 times and/or at most 3 times the external diameter of the rotor. The internal diameter of the fins in this case is usually to be understood as the diameter of the largest possible circle centered on the rotor axis, outside of which the slots are completely arranged. The external diameter of the rotor is usually understood as the diameter of a smallest possible circle centered on the rotor axis at the same axial position within which the rotor is fully arranged. The proposed media gap motor usually comprises a flow chamber that is at least partially or completely formed by a particularly essentially hollow-cylindrical gap between the inner ends of the fins, and in particular the rotor, and by stator slots between adjacent fins.

The torque constants can surprisingly be significantly increased by the proposed media gap motor. The air mass flow can be guided through the media gap between the rotor and the end of the fins and through the stator slots, minimizing flow losses and simultaneously achieving higher cooling performance through the intake air. Magnetic losses, in particular hysteresis losses, can be reduced by the proposed media gap motor. In addition, losses in terms of apparent power are minimized. In a particular embodiment, the advantages described are obtained in that the internal diameter of the fins is at least 1.2 times, in particular at least 1.4 times, and/or at most 3 times, in particular at most 2 or 1.6 times, the external diameter of the rotor, for example, 1.5 times. To a certain extent, the fins can continue the stator teeth in the media gap and thus improve the magnetic flux in a particularly advantageous manner. However, this application also describes embodiments which are already advantageous in and of themselves independently of this relationship. With regard to the fluidic and magnetic properties of the media gap motor, it has surprisingly turned out to be particularly advantageous if the internal diameter of the fins in an exemplary embodiment is at least 1.4 times and at most 2 times the external diameter of the rotor. However, the advantages described are achieved, possibly to a lesser extent, by a size ratio in a wider range. Due to the fact that the fins do not extend by means of their inner portions as far as the rotor, they usually do not form a bearing for the rotor or a rotor shaft.

The present application also relates to a turbocharger. The proposed turbocharger for internal combustion engines can comprise a compressor arrangement for compressing fresh air. In addition, the proposed turbocharger may include the media gap motor described above or below. The compressor arrangement may include a compressor wheel. In typical embodiments, the rotor is coupled to the compressor wheel. Provision can be made for the fins to comprise an outer portion extending in the radial direction outside of the flow chamber. In addition, the stator may comprise coils that encircle or surround the outer portions of the fins. Typically, each fin is associated with a coil.

In typical embodiments, the fins are elongated and extend in the axial direction. In particularly advantageous embodiments, stator slots are formed in the flow chamber between the fins such that at least part of a medium flows through them. Typically, the stator slots are formed by the space between the fins available for the medium to flow through. Usually, no coils or windings of the stator and in particular no solid objects are arranged in the stator slots through which the medium flows. The stator slots are typically surrounded on both sides by the inner portions of the fins. Usually, the inner portions of the fins, between which the stator slots through which the medium flows are arranged, have a length in the radial direction that is at least one third, in particular at least one half or particularly advantageously at least two thirds, of a length in the radial direction of the outer portions around which the coils of the stator run. An extent of the stator slots through which the medium flows in the radial direction is usually at least a quarter, in particular at least half, of the external diameter of the rotor, and therefore the media gap motor achieves the advantages described in a special way with regard to its magnetic and fluidic properties. In some embodiments, the inner portions of the fins comprise a radially inner region. In the radially inner region, the inner portions of the fins can comprise a widened portion, in particular compared to a narrower radially outer region of the inner portions of the fins. The stator slots through which the medium flows can be formed both between the inner regions and between the outer regions of the inner portions of the fins. The inner portions of the fins are usually not connected to one another within the flow chamber. In addition, inner ends of the fins, in particular the inner regions of the inner portions of the fins, can be free-standing, the inner ends of the fins, in particular the inner regions of the inner portions of the fins, typically not being connected to one another via a sleeve or other component. The flow chamber through which the medium usually flows during operation is typically formed in an outer region by the stator slots and/or delimited in an inner region by the possibly rotating rotor, in particular not by stationary sleeves or similar components, in particular in the axial region of the fins and/or the rotor magnet.

Provision can be made for the coils and the outer portions of the fins to be arranged beyond a radial seal of the flow chamber. The coils can thus be arranged outside of the flow chamber, whereby both the magnetic flux and the flow properties can be optimized. Provision is usually made for the fins, in particular both their outer portions and their inner portions, to form an active part of the magnetic circuit. The fins can be set up to optimize the magnetic flux in this way. Usually, the outer portions and/or the inner portions of the fins comprise a rectangular cross-section. Significant advantages can be achieved in assembly in this way, in particular in connection with the flow cap described below. Furthermore, the rotor typically comprises a rotor magnet. The fins usually have an axial overlap with the rotor magnet. With regard to the flow direction, the fins are therefore usually not only arranged behind or in front of the rotor magnet, but also at least at the axial height of the rotor magnet. Provision can also be made for the fins to comprise an axial overhang with the rotor magnet. The optimization of the magnetic flux through the fins can be ensured in an advantageous manner in this way. The fins are typically at least as long in the axial direction as the rotor magnet. In particular, it can be provided that the fins are extended over the entire axial extent of the rotor magnet. However, in other embodiments, it can also be provided for the length of the rotor magnet to exceed a total length of the fins in the axial direction, and therefore there is a shelter.

A largest diameter of the flow chamber through which the medium usually flows during operation, in particular measured on an outside of the stator slots or an inside of the radial seal or the cover plates that may be present, is typically at least twice, in particular at least three times and/or at most one ten times, in particular at most eight or five times, the external diameter of the rotor.

The result here is that the coils and/or the outer portions of the fins are usually arranged outside of the flow chamber, that is, at a radial position as far as which the flow chamber no longer extends in its radial extent. Thus, in this case, the coils and/or the outer portions of the fins are arranged beyond a radial seal of the flow chamber. In this way, with a comparatively large media flow opening, which is formed by a part of the flow chamber that is not blocked, that is, in particular occupied by the fins, an optimized magnetic flux and optimized heat dissipation can be ensured. In this case, the magnetic field can be guided from each of the coils arranged outside the radial extent of the flow chamber, via the outer portion of an associated fin in the radial direction through the flow chamber and to the rotor. This further enables a simplified design and assembly of the media gap motor or turbocharger, as is explained in more detail below.

The fins can be arranged distributed uniformly or regularly over a circumference. Stator slots are usually formed in the flow chamber between the fins, through which stator slots at least part of the medium flows. In typical embodiments, the media gap motor, which may be a 3-phase, 2-pole media gap motor, in particular for turbochargers, has a number of fins equal to 3 or a multiple of 3. The media gap motor comprises, for example, 3, 6, 12 or 24 fins along the circumferential direction for optimized magnetic field guidance. In some embodiments, the media gap motor may comprise at most 24 fins along the circumferential direction to optimize the size of the media passage opening.

In some embodiments, it is provided that the coils are accommodated on coil carriers. Furthermore, the coils, together with the coil carriers, can be pushed or plugged onto the outer portions of the fins, in particular from the outside. This enables the media gap motor to be assembled quickly and easily without creating disadvantages in the magnetic flux or in heat dissipation. It is not absolutely necessary for the fins to comprise inner portions therefor. For example, for particular simplification of production, the coils can be prefabricated with the coil carriers, which was not possible or at least not provided for in a plurality of known arrangements.

In typical embodiments, the outer portions of the fins are integral with the inner portions, particularly in the sense that a monolithic part of the fin is continuous from the outer portion of the fin to the inner portion. In this way, the magnetic flux through the fins and thus the magnetic flux from the stator to the rotor can be improved and the efficiency of the media gap motor can be increased.

In typical embodiments, the media gap motor comprises a yoke ring. The outer portions of the fins can be attached to the yoke ring. In particular, the outer portions can be attached to an inside of the yoke ring and/or protrude inward from the yoke ring. It is not absolutely necessary for the fins to comprise inner portions therefor. The yoke ring can serve to return the magnetic field, give the electric motor of the compressor arrangement structural support and contribute to the stability and durability of the media gap motor.

Provision can be made, for example, for the outer portions of the fins to be glued or welded to the yoke ring or to portions of the yoke ring or to be formed in one piece therewith, that is, monolithically. A one-piece embodiment leads to a particularly robust embodiment with optimized magnetic flux. In other particularly preferred embodiments, however, the outer portions of the fins are connected to the yoke ring via a plug connection. For this purpose, a plug connector element can be provided on the outer portion of the fins, the plug connector element being able in particular to be designed in one piece with the remainder of the outer portion. The yoke ring can comprise correspondingly complementary plug connector elements. Here, the outer portions of the fins are connected to the yoke ring via a dovetail connection for quick assembly of the media gap motor with optimized magnetic flux and optimized heat dissipation.

In some preferred embodiments, different portions of the yoke ring connected to different fins are connected to each other via articulated joints. The articulated joints can be implemented, for example, by means of hinges or, for example, by the portions of the yoke ring being fastened, for example, glued, with their outer surfaces next to one another on a deformable film, for example, an adhesive film. The proposed media gap motor can thus be assembled in a particularly simple manner, a mechanically robust structure being achieved simultaneously. An axis of rotation of said articulated joints is usually oriented parallel to an axis of rotation of the rotor. A pile chain can thus result in this way. Provision can be made here in particular for individual portions of the yoke ring to be designed in one piece with an associated fin, and therefore the media gap motor can be constructed in a structurally simple manner with optimized magnetic flux and simultaneously can be assembled quickly and precisely. The articulated joints are usually provided on the outer edges of the portions of the yoke ring.

In preferred embodiments, it can be provided that the media gap motor comprises cover plates. The cover plates can be arranged between the outer and inner portions or at an inner end of the outer portions of respectively adjacent fins. In addition, the cover plates can delimit a region of the flow chamber. In particular, a seal in the radial direction can be achieved by the cover plates. The cover plates and the fins can completely encircle the flow chamber in the circumferential direction. Provision can be made for the cover plates to be arranged between the coils of the stator and the flow chamber.

The cover plates can be designed as cover slides, for example. Provision can be made for the adjacent fins, in particular between the inner portion and the outer portion, to comprise grooves extending in particular axially, that is, in a direction parallel to the rotor axis, into which grooves the cover plates are inserted. In this way, the cover plates can be inserted between the adjacent fins for simple and mechanically stable assembly, in particular in the direction parallel to the rotor axis.

In some embodiments, however, it is also advantageously provided for the cover plates to be formed in one piece with the fins. For example, the cover plates and the fins can form a one-piece or monolithic fin ring. Typically, the fin ring completely encircles the flow chamber in the circumferential direction. The media gap motor thus has a simple design and is particularly stable. In particular, if the outer portions of the fins are then connected to the yoke ring, a simple assembly of the media gap motor can be guaranteed.

For improved robustness, improved magnetic flux, an enlarged media passage opening and improved heat dissipation, it can also be provided for the outer portions of the fins to have a greater width than the inner portions of the fins. The width here refers to an extension in the circumferential direction. For example, the fins can be widened in the radial direction, in particular in the region between the inner and outer portions, and in particular abruptly. In order to improve the ability to assemble the coils and in particular to allow them to be plugged on or pushed on, the outer portions of the fins in the region around which the coil runs are also designed to have a constant width, in particular the larger width.

Provision can also be made for the coils to be formed by a winding curved along a circular line and/or for the coil carriers to be curved along a circular line. The curvature usually follows a curvature of the seal of the flow chamber, in particular a curvature of the cover plates. In this way, a compact embodiment can be achieved with improved introduction of the magnetic field.

It can also be provided for only some of the fins to not extend by means of their inner portions as far as the rotor.

In further embodiments, the media gap motor comprises a flow cap. The flow properties of the media gap motor can be optimized by the flow cap. The flow cap can be designed as a separate component. It may be that the flow cap can be attached to further components of the media gap motor in front of and/or behind the fins, for example, screwed on. The flow cap can also be continued in the axial direction, in particular with thin walls, in order to partially or completely enclose the fins, in particular the stator laminations of the fins. For example, the flow cap may enclose side surfaces and/or a radially inner end of the fins. In typical embodiments, the flow cap is formed in one piece. The flow cap can be made of a magnetically non-active material. For example, the flow cap can be a plastic part. For example, the flow cap can be a prefabricated part, in particular a prefabricated injection molded part. The flow cap can be used to improve the aerodynamics of the media gap motor without the magnetic properties being significantly affected by the flow cap.

The flow cap can be arranged in front of the rotor and in particular in front of the fins with respect to a flow direction. In this embodiment, the flow cap can be referred to as an inflow cap. In addition, the flow cap can comprise an inflow dome. The inflow dome can cover the rotor. Additionally or alternatively, the flow cap can comprise inflow edges. The inflow edges can be arranged in front of the fins and/or at least partially or completely cover said fins. The inflow edges can be formed by tapering in a direction opposite to the flow direction. It can be provided for the inflow edges to cause an opposite droplet shape of the flow cap and/or the flow cap in connection with the fins. The opposite droplet shape, as opposed to a droplet shape, is to be understood as the described object being narrower on its inflow side (whereas a droplet is known to be narrower on its non-inflow side).

The flow cap may also be arranged behind the fins with respect to a flow direction. In this embodiment, the flow cap can be referred to as an outflow cap. The outflow cap can comprise outflow edges. The outflow edges can be arranged behind the fins and/or at least partially or completely cover said fins. The outflow edges can be formed by tapering in the flow direction. Provision can be made for the media gap motor to comprise both an inflow cap and an outflow cap. Both the inflow cap and the outflow cap can have the properties described in general for the flow cap.

The fins and/or the yoke ring typically have, in particular anisotropic, magnetically conductive properties. The fins and/or the yoke ring are typically made from electrical laminations, laminated electrical steels or stator laminations. The fins can be designed as a laminated stator core having individual laminations. Furthermore, the fins and the optionally present yoke ring can be designed as a one-piece (that is, continuous with respect to the individual laminations) laminated stator core. A length of the fins is usually at least an overall length of the rotor magnet. The fins can be used to focus the line of magnetic flux from the stator to the rotor magnet and reduce stray losses. Said fins can thus improve the electrical properties of the media gap motor. The flux lines usually lead from the fins through the air gap directly into the rotor magnet.

Furthermore, it can be provided that the fins and in particular their inner portions are cranked. In this case, the possibly present stator laminations of the fins can be cranked. As a result, the overhang of the magnet rotor can be reduced and/or the installation space for the winding overhang can be increased and thus, for example, an increase in a copper fill factor can be implemented. Typically, the fins or their stator laminations are tapered, in particular such that radially inner ends of the fins lie further in the flow direction. In a particularly preferred embodiment, the inner portions of the fins are tapered such that radially inner ends of upstream sides of the inner portions lie further in the flow direction than radially outer ends of upstream sides of the inner portions. It can also be provided for the outer portions of the fins to not be tapered. In this way, on the one hand, an optimization and improvement of the rotor dynamics can be achieved and, on the other hand, it can be ensured that the magnetic properties and the assembly capability are not impaired.

In some embodiments, it is provided that the flow cap comprises angled outflow edges arranged behind the fins with respect to a flow direction, in order to generate a pre-swirl in the medium or in an intake medium. As a result, the flow cap can contribute to the further improvement of the media gap motor, in that a pre-swirl is generated by an inclined position of the outflow edges, having an advantageous effect on the compressor characteristics.

In typical embodiments, the media gap motor also comprises power electronics. The power electronics are usually 3-phase power electronics. The power electronics can be set up to actuate the motor phases. The power electronics are typically set up to determine the position of the magnet rotor, in particular at any point in time. Provision can also be made for the power electronics to be set up to carry out field-oriented regulation, in particular vector regulation. The rotor position is preferably determined without sensors, in particular without transmitters, that is, using the induced motor voltage (EMF). A commutation of the current flow is preferably implemented in a sinusoidal manner. The torque ripple can thereby be kept as low as possible. The sensorless regulation is preferably carried out with the aid of a continuous current measurement. For this purpose, it can be provided for the power electronics to comprise current sensors. The power electronics can comprise a DC voltage intermediate circuit. Furthermore, the power electronics can comprise a power section (output stage). In addition, the power electronics typically comprise regulation electronics, in particular with a microcontroller. In turbocharger applications, the power electronics can be designed for both motor and generator operation of the media gap motor. The system can thus be designed both for boosting and for recuperation.

An operating range of the sensorless regulation (active mode) can start at a minimum speed, depending on the magnitude of the induced voltage. In turbocharger applications, said minimum speed can be achieved by the exhaust gas mass flow when the combustion engine is idling. In other applications, the motor is ramped up in a controlled manner up to the minimum governed speed. In order to operate the system as a motor or as a generator, the media gap motor must usually be in active mode, that is, in (sensorless) regulation. The maximum governed speed can be limited due to the clock frequency of the regulation, that is, dependent on the regulation electronics, the quality of the microcontroller and the software. If the maximum governed speed, for example, in turbocharger applications, is exceeded by the exhaust gas mass flow of the combustion engine, the regulator preferably switches to the so-called passive mode. In this case, the circuit breakers are usually permanently open and the motor is idling. When the speed drops, the media gap motor is preferably switched back to active mode. Provision can be made for the necessary rotor position to be determined with the aid of voltage sensors and for the regulation to be resumed. In this context, it is also referred to as recapturing or jumping up to speed.

During regulation, the system usually knows the exact speed of the turbocharger at all points in time, enabling the charging to be regulated precisely. This information can also be used for vehicle diagnostics (on-board diagnostics, OBD) and, among other things, for determining the surge limit of the turbocharger.

The present application also relates to a method for producing the media gap motor, wherein the features described above or below in relation to the media gap motor correspondingly apply to the method.

Embodiments are described below with reference to the illustrations. Shown are

Figure 4A:
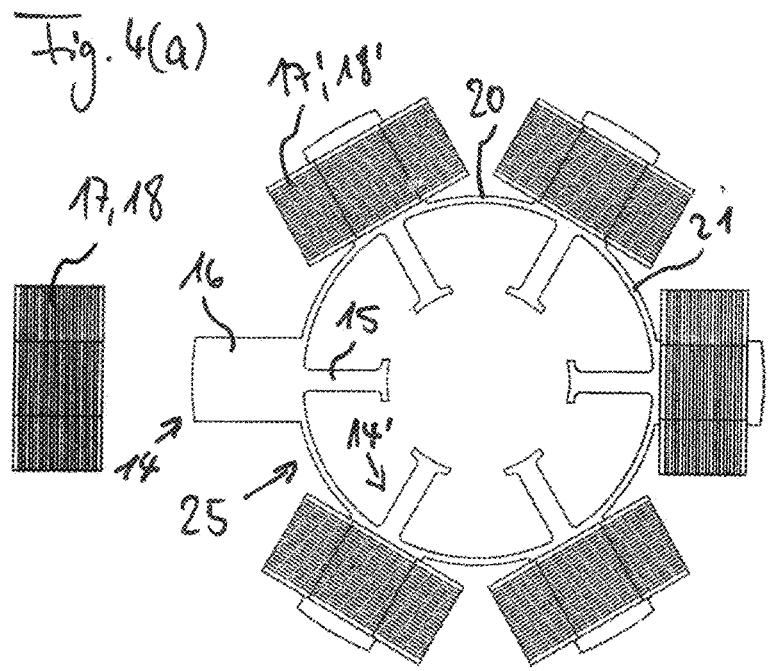
Figure 4B:
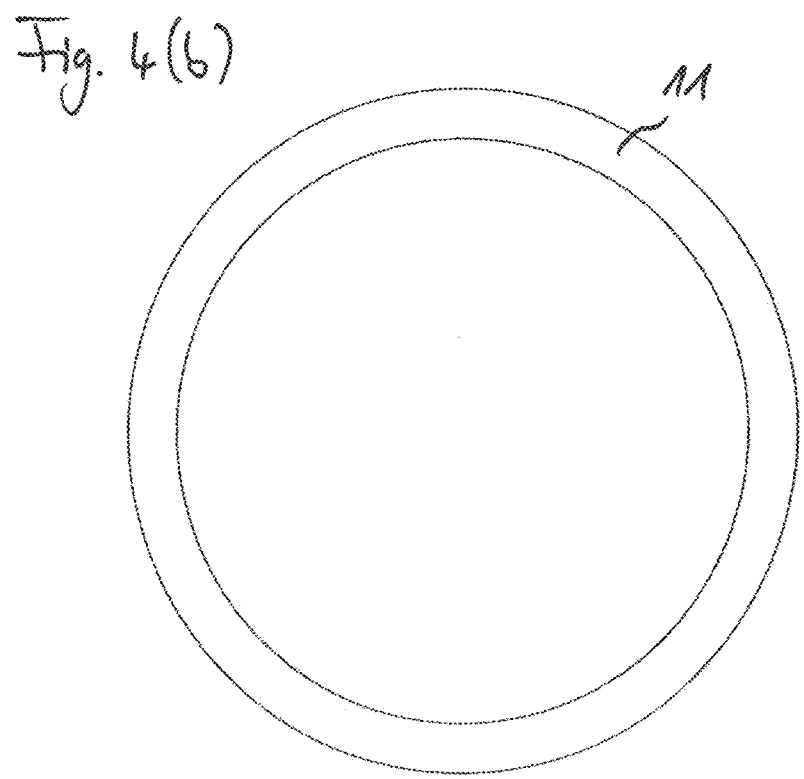
Figure 7A:
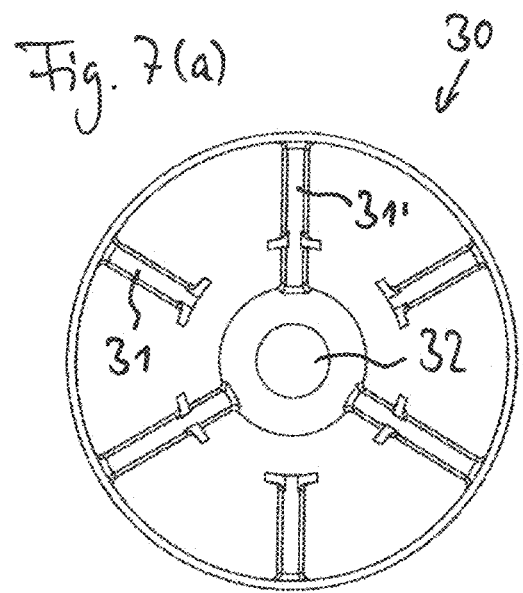
Figure 11A:
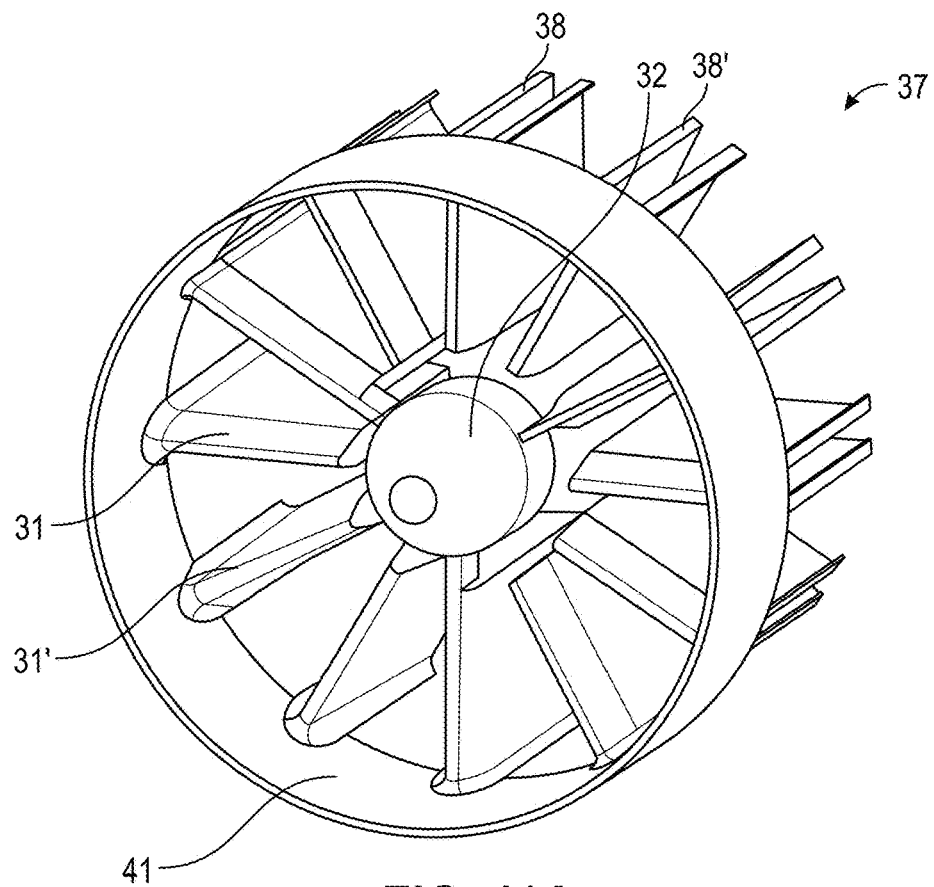
Figure 11B:
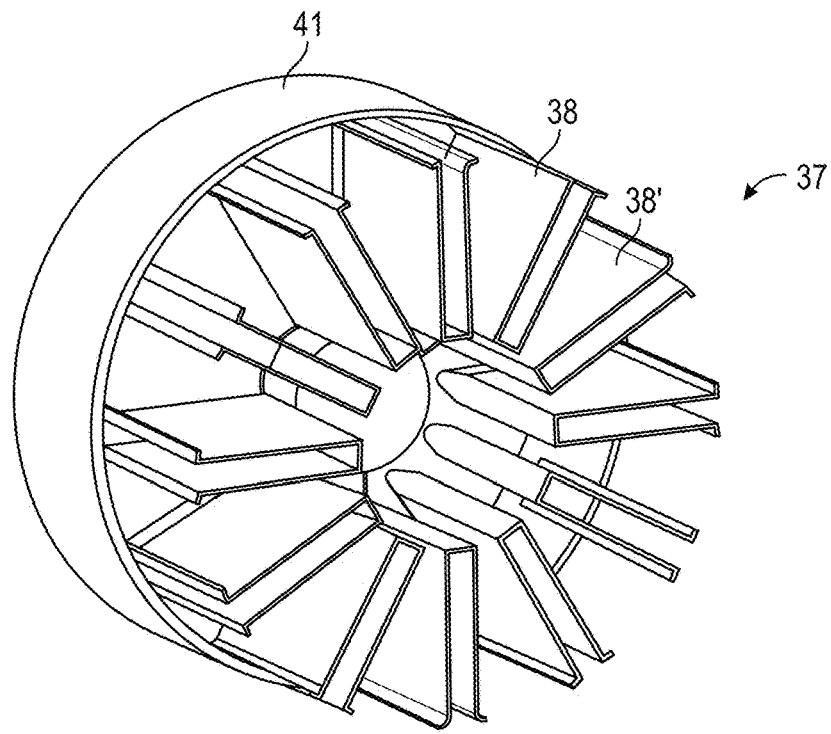
Figure 12A:
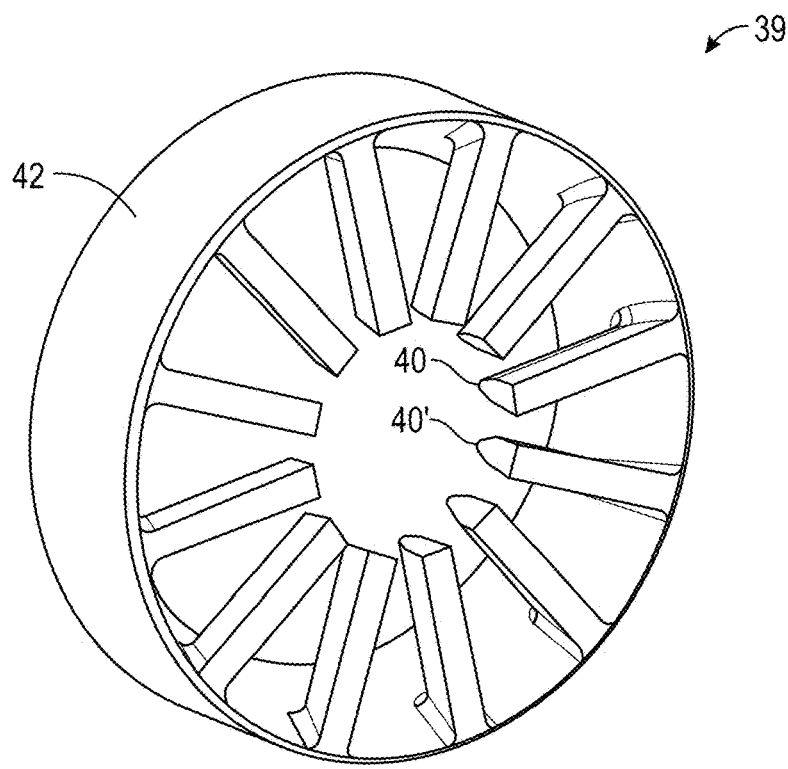
Figure 12B:
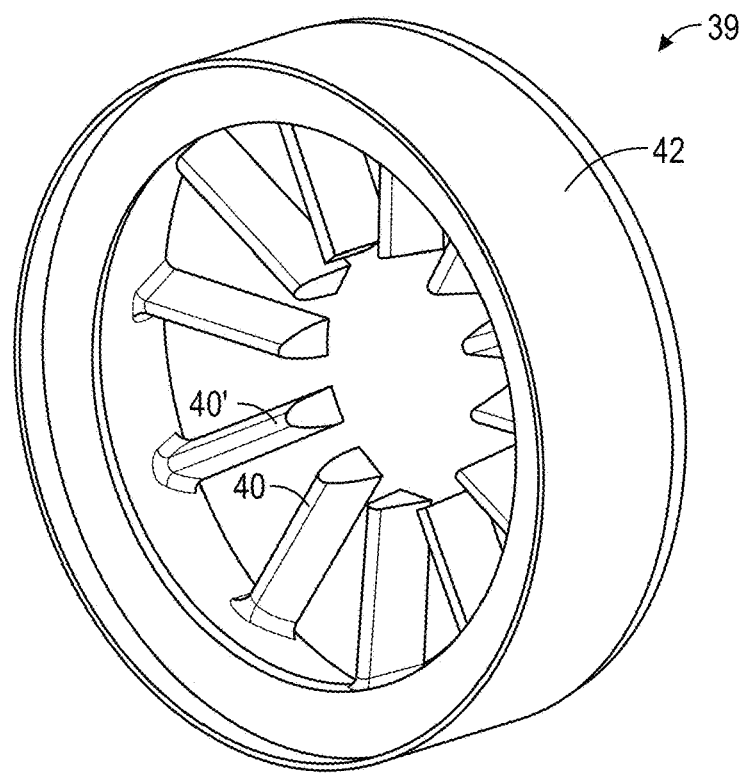
Figure 13A:
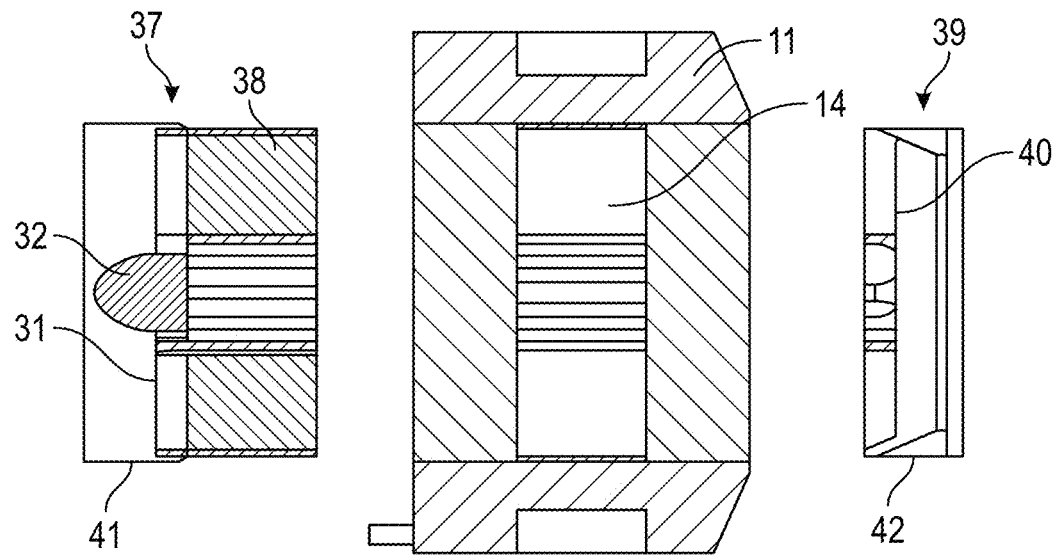
Figure 13B:
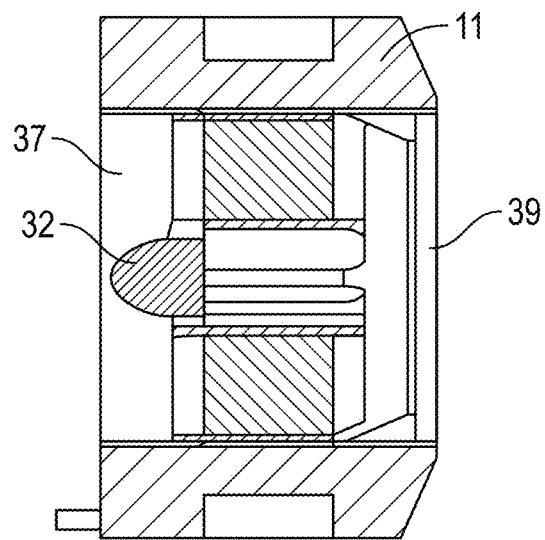

FIG. 1 a view of a turbocharger,

FIGS. 2(a) and (b) schematic views of a stator of the turbocharger,

FIG. 3 a perspective view of a coil and a bobbin,

FIGS. 4(a) to (c) schematic views of the stator of the turbocharger according to a further embodiment, FIGS. 5(a) to (c) schematic views of the stator of the turbocharger according to a further embodiment, FIG. 6 a schematic view of the stator of the turbocharger according to a further embodiment, FIGS. 7(a) and (b) schematic views of flow caps, FIGS. 8(a) and (b) perspective views of the stator with flow caps, FIG. 9 a schematic view of the stator according to FIG. 8(a), FIGS. 10(a) and (b) cross-sectional views of media gap motors, FIGS. 11(a) and (b) perspective views of an inflow cap, FIGS. 12(a) and (b) perspective views of an outflow cap, FIGS. 13(a) and (b) sectional views of the inflow and outflow cap and FIG. 14 stator laminations with cranked fins.

In a partially exploded view, FIG. 1 shows an electrically modified mechanical turbocharger 1 which can be coupled to an internal combustion engine with a turbine housing 2. In general, however, the invention described can also relate to other media gap motors, for example, with spiral conveyors. After combustion, the exhaust gas is collected by the exhaust manifold shown in the illustration and used to drive a turbine wheel 3. The turbine wheel 3 is surrounded by the turbine housing 2 and is essentially taken from a conventional mechanical turbocharger. A bearing housing 4 and then a compressor housing 5 adjoin the turbine housing 2. A compressor wheel 6 is arranged in said compressor housing 5 and compresses air supplied through an inlet opening. The air is then routed to the combustion chamber of the internal combustion engine. In the example shown, the compressor wheel 6 has an extension on the left side, on which extension a rotor 7 of an electric motor is arranged. The rotor 7 in this case is freely cantilevered, that is, the rotor 7 is not mounted separately. When the turbocharger 1 is fully assembled, the rotor 7 is mounted centrally in the inlet air opening. The air inlet flow direction is marked with an arrow with reference number 8 in the illustration.

A stator 9 is provided around the rotor 7, the stator 9 being shown only schematically in the figure and essentially having a hollow-cylindrical shape. In the present case, the stator 9 is provided as an insert in a corresponding opening, so that it can be assembled very easily. A rotor gap formed between the rotor 7 and the stator 9 forms the inlet air opening for the compressor wheel 6. The rotor 7 of the electric motor comprises a rotor magnet surrounded by a reinforcement.

The compressor wheel 6 can (but does not have to) be made of a non-metallic material; in an embodiment made of an unreinforced plastic, for example, the influence on the electromagnetic field of the electric motor is minimized. The rotor magnet, in turn, is designed to be hollow in some regions so that it can be plugged onto a common shaft with the compressor wheel 6. In the present embodiment, a shaft 10 connecting the turbine wheel 3 to the compressor wheel 6 is designed such that the turbine wheel 3, the compressor wheel 6 and the rotor 7 are connected to one another in a torque-proof manner.

The target voltage of the electric motor is 12 V, for example, but other voltages (for example 48 V to 800 V for hybrid vehicles) are also possible. In the example shown, the rotor magnet of the rotor 7 is designed such that it is partially or completely integrated into the compressor wheel 6 or is connected thereto. A smallest internal diameter of the stator 9 can be 1.5 to 8 times larger than a largest external diameter of the rotor 7. The electric motor can be operated both in motor mode (to accelerate and avoid turbo lag) and in generator mode (to recover energy). If the charging pressure (in the turbine housing 2) reaches a specific target value, additional electrical energy is generated using a regenerative converter. The electric motor of the turbocharger 1 is connected to a store for electrical energy in order to draw electrical energy when the turbocharger 1 is operating as a motor and to feed in electrical energy when the turbocharger 1 is operating as a generator. For efficient control of the drive system or turbocharger 1, control electronics are provided for determining the speed of turbine wheel 3 or compressor wheel 6, actual values of pressure conditions on the turbine housing side and compressor housing side, and further torque-relevant values for the internal combustion engine.

FIG. 2(a) shows a schematic view of the stator 9 of the turbocharger to be produced, viewed in the direction transverse to the rotor axis. Recurring features are provided with the same reference symbols in this and the following figures. The stator 9 comprises a yoke ring 11 which, in the illustration shown, is designed as a pole chain having six portions. Two of the portions of the yoke ring 11 are identified by the reference numerals 12 and 12' by way of example. All portions 12, 12' of the yoke ring 11 are connected to one another via articulated joints, identified by way of example with reference numerals 13 and 13'.

The portions 12, 12' of the yoke ring 11 are each formed in one piece with a fin 14, 14', that is, monolithically, coherently. The fins 14, 14' each comprise a thinner inner portion 15, 15' and a widened outer portion 16, 16'. During production of the turbocharger 1, coils 17, 17' of the stator 9, which are accommodated on coil carriers 18, 18', are pushed or plugged onto the outer portions 16, 16' of the fins 14, 14'.

The fins 14 comprise grooves 19, 19' running axially on both sides between the outer portions 16 and the inner portions 15. During the production of the turbocharger, cover plates 20, 20' are pushed into the grooves 19, 19' of adjacent fins in the axial direction. The cover plates 20, 20' then (together with the fins 14) seal off a flow chamber 29 of the turbocharger 1 in the radial direction, as illustrated in FIG. 2(b). In the configuration shown, the turbocharger 1 is assembled by folding the articulated joints 13, 13' such that the portions 12, 12' of the yoke ring 11 form a closed ring. After assembly, the inner portions 15, 15' of the fins 14, 14' extend in the radial direction inwards toward the rotor 7. The fins 14, 14' are also arranged distributed evenly over the circumference. The flow chamber 29 comprises stator slots 22 for media delivery through the turbocharger 1, the stator slots 22 being delimited by intermediate spaces between the inner portions 15, 15' of the fins 14, 14', and a media gap 23 completely surrounding the rotor 7, the media gap 23 extending in a radial region between the rotor 7 and inner ends of the fins 14, 14'. An internal diameter of the fins 14, 14', based on the largest possible circular diameter centered on the rotor axis, can be, for example, at most 50 mm, in particular at most 37.5 mm, and/or at least 15, for example, 26 mm. An external diameter of the rotor can be at the same axial position, based on the smallest possible circular diameter, for example, at most 25 mm and/or at least 10 mm, for example, 17 mm. The fins 14, 14' also comprise widenings 24, 24' at their inner ends to reduce the magnetic cogging torque.

FIG. 3 illustrates in an exemplary perspective view of how the coil 17 is accommodated on the bobbin 18. The coil 17 in this case is wound around the bobbin 18 and prefabricated together with the bobbin 18. In the example shown, the coil 17 is pushed onto the outer portion 16 of the fin 14 together with the bobbin 18 from the outside, the inner portion 15 of the fin 14 not being shown in this figure.

FIGS. 4(a) to (c) show a schematic view of the stator 9 of the turbocharger 1 according to a further embodiment. This embodiment corresponds to that described above, wherein, however, the cover plates 20, 21 are designed in one piece, that is, monolithically, with the fins 14, 14' and thus with their inner and outer portions 15, 16. In this embodiment, the fins 14, 14' together with the cover plates 20, 21 form a one-piece fin ring 25. When the turbocharger 1 is assembled, the coils 17 together with the coil carriers 18 are pushed onto the outer portions 16 of the fins 14 from the outside. The fin ring 25 is then inserted together with the coils 17 into a yoke ring 11 shown in FIG. 4(b) and connected thereto, therefore resulting in the configuration shown in FIG. 4(c).

FIGS. 5(a) to (c) show a stator 9 of the turbocharger 1 according to a further embodiment. This embodiment corresponds to that described above, wherein, however, the fins 14 can be attached to the yoke ring 11 via a dovetail connection. For this purpose, the fins 14 comprise dovetail-shaped pins 26, 26' on their outer portions 16, dovetail-shaped pins 26, 26' being able to be pushed into correspondingly shaped grooves 27, 27' on an inner side of the yoke ring 11.

A further embodiment of the stator 9 is shown in FIG. 6. This embodiment can correspond in all features to the embodiments described above, wherein, however, the coils 17, 17' and bobbins 18, 18' are curved such that the inner sides 28, 28' of the coils or bobbins correspond in shape to a segment of a circle. Said inner sides 28, 28' follow the shape of the cover plates 20, 21 delimiting the flow chamber 29. The space available for generating the magnetic field can be optimally utilized In this way.

Figure 7B:
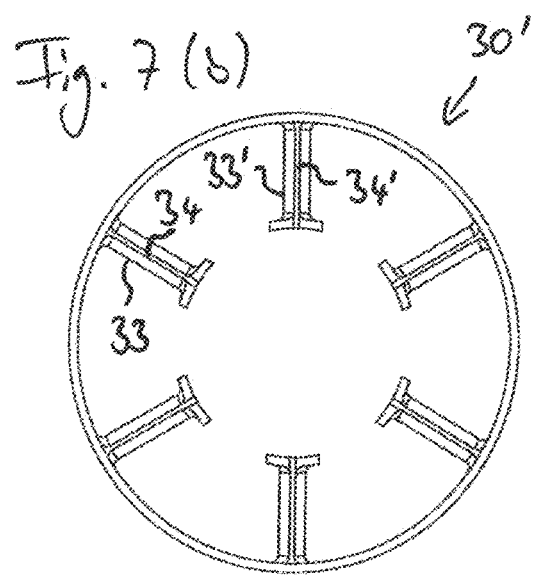

FIGS. 7(a) and 7(b) show flow caps 30, 30' according to two different embodiments. FIGS. 8(a) and 8(b) show corresponding perspective views in which the stator 9 is equipped with one of the flow caps 30, 30'. FIG. 9 shows a plan view of the stator 9 according to FIG. 8(a). The flow caps 30, 30' are arranged upstream in front of the fins 14 of the stator 9 and improve the flow behavior. The flow cap 30 of FIGS. 7(a), 8(a) and 9 comprises six struts 31, 31' distributed over the circumference, each of which covers one of the fins 14 in the axial direction. Three of the struts 31, 31' hold an inflow dome 32 which is arranged in an axially central position and which tapers in the upstream direction and which covers the rotor 7 of the turbocharger 1. The embodiment of the flow cap 30' of FIGS. 7(b) and 8(b) also comprises struts 33, 33' extending inward. Said struts 33, 33' comprise pronounced inflow or outflow edges 34, 34' at their upstream end.

To illustrate possible fin geometries, FIGS. 10(a) and 10(b) show media gap motors having different fin lengths in cross-section. FIG. 10(a) shows a stator 9 having a minimum inner fin diameter of 20.5 mm and a rotor magnet diameter of 15 mm, a 2 mm thick reinforcement of the rotor 7 being provided. FIG. 10(b), on the other hand, shows a stator 9 having an inner fin diameter of 45 mm, the rotor magnet diameter again being 15 mm and the thickness of the reinforcement of the rotor 7 again being 2 mm. In FIGS. 10(a) and (b), the internal diameter of the fins 14, 14' is indicated by the dashed line with reference numeral 35. The external diameter of the rotor 7, on the other hand, is indicated by a dashed line with reference number 36. In FIGS. 10(a) and 10(b), as in the previous illustrations, it can be seen that the flow chamber through which the medium usually flows during operation is typically formed in an outer region by the stator slots and in an inner region is delimited by the optionally rotating rotor. The radially outer flow region of the stator slots and the radially inner, annular flow region, which lies between the fins and the rotor, are directly connected to one another or merge directly into one another.

FIGS. 11(a) and (b) show an inflow cap 37 in a front view (viewed in the flow direction) and a rear view (viewed against the flow direction). The inflow cap 37 is prefabricated as a one-piece, magnetically inactive plastic part and can be pushed onto the stator laminations of the fins 14 and attached in the axial flow direction. The inflow cap 37 comprises a ring element 41 and the inflow edges 31, 31' extending inward from the ring element and covering the fins 14. In addition, the inflow cap 37 comprises the inflow dome 32 covering the rotor 7. The inflow dome 32 is held by part of the inflow edges 31, 31'. The inflow cap 37 also comprises thin-walled, sleeve-like extensions 38, 38' enclosing the stator laminations of the fins, which have a rectangular cross-section. Here, the extensions 38, 38' enclose the two side surfaces and the radially inner ends of the fins 14.

FIGS. 12(a) and (b) show an outflow cap 39 in a front view (viewed in the flow direction) and a rear view (viewed against the flow direction). The outflow cap 39, like the inflow cap 37, is prefabricated as a one-piece, magnetically inactive plastic part and can be attached to other parts of the media gap motor. The discharge cap 39 comprises a ring element 42 and outflow edges 40, 40' extending inwardly from the ring element 42 and covering the fins 14 on the downstream side. In preferred embodiments, the outflow edges can be designed such that they generate a pre-swirl through an inclined position, having an advantageous effect on the compressor characteristics. The outflow edges 40, 40' are not hollow.

As FIGS. 13(a) and (b) illustrate, the inflow cap 37 and the outflow cap 39 can be pushed into the stator as prefabricated parts in the axial direction towards one another such that the extensions 38, 38' surround the stator laminations of the fins 14 like a sleeve.

FIG. 14 shows the stator laminations of cranked fins 14 according to one embodiment. The stator laminations of the fins 14 are made from stamped individual laminations and are formed in one piece with the yoke ring 11 in the example shown. The individual laminations are stacked on top of one another in the axial direction. It can be seen that the outer portions 16 of the fins 14 and the inner portions 15 of the fins 14 have a rectangular cross-section. The outer portions 16 of the fins 14 have a constant cross-section in the radial direction. A cross-sectional area of the fins 14 decreases in a stepwise manner from the outer portion 16 to the inner portion 15. A cross-sectional area of the inner portions 15 of the fins 14 continuously decreases in the radially inward direction by providing tapered surfaces 43, 43' on the upstream side of the inner portions 15 of the fins 14. On the other hand, upstream sides of the outer portions 16 of the fins are not tapered and run transversely to the axial direction.

Features of the various embodiments disclosed only in the exemplary embodiments can be combined with one another and claimed individually.

The invention claimed is:

1. A media gap motor for a turbocharger, the media gap motor comprising:
    a rotor; and
    a stator, surrounding at least a coaxial portion of the rotor, the stator comprising:
        multiple stator fins that extend from an inner portion of the stator radially towards the coaxial portion of the rotor in a flow chamber formed between the stator and the coaxial portion of the rotor, wherein the multiple stator fins do not extend as far as the coaxial portion of the rotor, and therefore a gap is formed between an inner end of each of the multiple stator fins and extending circumferentially about the coaxial portion of the rotor, and wherein an internal diameter of each of the multiple stator fins is at least 1.2 times and at most 3 times an external diameter of the coaxial portion of the rotor.

2. The media gap motor according to claim 1, wherein the internal diameter of each of the multiple stator fins is at least 1.4 times and at most 2 times the external diameter of the rotor.

3. The media gap motor according to claim 1, multiple stator slots are formed in the flow chamber between the multiple stator fins such that at least part of a medium flows through the multiple stator slots.

4. The media gap motor according to claim 3, wherein an extent of the multiple stator slots through which the medium flows in a radial direction is usually at least a quarter of the external diameter of the rotor.

5. The media gap motor according to claim 1, wherein the flow chamber is delimited in an inner region by the rotor.

6. The media gap motor according to claim 1, wherein the flow chamber is at least partially formed by a hollow-cylindrical gap between the inner ends of the multiple stator fins and the rotor and by a stator slot between a first fin of the multiple stator fins and a second fin of the multiple stator fins, wherein the second fin is adjacent to the first fin.

7. The media gap motor according to claim 1, wherein a maximum diameter of the flow chamber is at least twice the external diameter of the rotor.

8. The media gap motor according to claim 1, wherein each fin of the multiple stator fins comprise an outer portion extending radially outside the flow chamber, and wherein the stator comprises multiple coils surrounding the outer portions of the multiple stator fins.

9. The media gap motor according to claim 8, wherein the multiple coils and the outer portions of the multiple stator fins are arranged beyond a radial seal of the flow chamber.

10. The media gap motor according to claim 8, wherein the outer portions of the multiple stator fins and the inner portions of the multiple stator fins form an active part of a magnetic circuit.

11. The media gap motor according to claim 8, wherein each coil of the multiple coils are located on a corresponding coil carrier, wherein each coil of the multiple coils and each corresponding coil carrier are located on the outer portion of a particular fin of the multiple stator fins.

12. The media gap motor according to claim 8, wherein the outer portions of the multiple stator fins are formed in one piece with the inner portions.

13. The media gap motor according to claim 8, further comprising:
a yoke ring to which the outer portions of the multiple stator fins are attached.

14. The media gap motor according to claim 13, wherein the outer portions of the multiple stator fins are connected to the yoke ring via a plug connection.

15. The media gap motor according to claim 13, wherein the outer portions of the multiple stator fins are connected to the yoke ring via a dovetail connection.

16. The media gap motor according to claim 13, wherein a first segment of the yoke ring is connected to a second segment of the yoke ring via an articulated joint, and wherein the first segment of the yoke ring is connected to a particular fin of the multiple stator fins and the second segment of the yoke ring is connected to a different particular fin of the multiple stator fins.

17. The media gap motor according to claim 8, further comprising:
a cover plate arranged between the outer portion and inner portion of a first fin and a second fin adjacent to the first fin, wherein the cover plate delimits a region of the flow chamber, and wherein the cover plate is located between the multiple coils of the stator and the flow chamber.

18. The media gap motor according to claim 17, wherein the first fin and the second fin comprise one or more axially extending grooves into which the cover plate inserted.

19. The media gap motor according to claim 17, wherein the cover plate is formed in a single piece with the multiple stator fins, such that the cover plate and the multiple fins form a one-piece fin ring.

20. The media gap motor according to claim 8, wherein the outer portions of the multiple fins have a greater width than the inner portions of the multiple stator fins.

21. The media gap motor according to claims 8, wherein the multiple coils are formed by a winding curved along a circular line.

22. The media gap motor according to claim 1, wherein the rotor comprises a rotor magnet, and wherein the multiple stator fins comprise an axial overhang with the rotor magnet.

23. The media gap motor according to claim 1, further comprising:
a flow cap arranged in front of the rotor, wherein the flow cap comprises at least one of an inflow dome covering the rotor or one or more, inflow edges arranged in front of the multiple stator fins.

24. The media gap motor according to claim 23, wherein the flow cap is continued in an axial direction in order to at least partially enclose the multiple stator fins, and wherein the flow cap at least partially encloses at least one of: one or more side surfaces of the multiple stator fins or a radially inner end of the multiple stator fins.

25. The media gap motor according to claim 23, further comprising:
a second flow cap arranged behind the multiple stator fins with respect to a flow direction, wherein the second flow cap comprises one or more outflow edges, wherein the one or more outflow edges at least one of: are arranged behind the multiple fins or at least partially cover the multiple stator fins.

26. The media gap motor according to claim 25, wherein the one or more outflow edges are angled and configured to generate a pre-swirl in an intake medium.

27. A turbocharger for an internal combustion engine, comprising:
a compressor arrangement for compressing fresh air;
a compressor wheel; and
a media gap motor, the media gap motor comprising:
a rotor; and
a stator, surrounding at least a coaxial portion of the rotor, the stator comprising:
multiple stator fins that extend from an inner portion of the stator radially towards the coaxial portion of the rotor in a flow chamber formed between the stator and the coaxial portion of the rotor, wherein the multiple fins do not extend as far as the rotor, and therefore a gap is formed between an inner end of each of the multiple stator fins and extending circumferentially about the coaxial portion of the rotor, and wherein an internal diameter of each of the multiple stator fins is at least 1.2 times and at most 3 times an external diameter of the coaxial portion of the rotor, and wherein the rotor is coupled to the compressor wheel.

28. A media gap motor for a turbocharger, the media gap motor comprising:
a rotor; and
a stator, surrounding at least a coaxial portion of the rotor, the stator comprising:
multiple stator fins extending from an inner portion of the stator radially towards the coaxial portion of the rotor in a flow chamber formed between the stator and the rotor, wherein the multiple stator fins do not extend as far as the rotor and therefore a gap is formed between an inner end of each of the multiple stator fins and extending circumferentially about the coaxial portion of the rotor, wherein an internal diameter of each of the multiple stator fins is at least 1.2 times and at most 3 times an external diameter of the coaxial portion of the rotor, wherein each fin of the multiple fins comprise an outer portion extending radially outside the flow chamber, and wherein the stator comprises multiple coils surrounding the outer portions of the multiple fins.

* * * * *